United States Patent

Levin

[15] 3,674,657
[45] July 4, 1972

[54] METHOD OF PRODUCING FAT AND EDIBLE SOLIDS FROM BIOLOGICAL MATERIAL USING VAPOR HEATED SOLVENT

[72] Inventor: Ezra Levin, Champaign, Ill.
[73] Assignee: VioBin Corporation, Champaign, Ill.
[22] Filed: April 8, 1970
[21] Appl. No.: 26,632

Related U.S. Application Data

[60] Division of Ser. No. 640,523, May 23, 1967, Pat. No. 3,509,933, which is a continuation-in-part of Ser. No. 408,231, Nov. 2, 1964, Pat. No. 3,538,973.

[52] U.S. Cl. ..........................203/49, 159/16 S, 159/47, 99/208, 99/209, 203/67, 203/70, 260/412
[51] Int. Cl. ..................B01d 1/14, B01d 1/00, F26b 7/100, B01d 3/34, A23b 1/04, A23b 3/04, C09f 5/00
[58] Field of Search ..............159/1, 17 VS, 42, 47, 25, 16 S; 34/63, 61; 23/267, 270, 280, 290.5; 202/175, 234; 203/12, 67, 70, 49, 47; 260/412.4, 412.8, 428.5; 99/208, 209

[56] References Cited

UNITED STATES PATENTS

| | | | |
|---|---|---|---|
| 1,934,677 | 11/1933 | Ash | 99/209 X |
| 2,273,557 | 2/1942 | Bonotto | 210/34 X |
| 2,503,312 | 4/1950 | Worsham | 99/209 X |
| 2,539,544 | 1/1951 | Levin | 99/209 X |
| 2,619,425 | 11/1952 | Levin | 99/209 X |
| 2,665,198 | 1/1954 | Harcourt | 260/412.8 X |
| 2,972,542 | 2/1961 | Levin | 99/209 |

*Primary Examiner*—Norman Yudkoff
*Assistant Examiner*—J. Sofer
*Attorney*—Burmeister, Palmatier & Hamby

[57] ABSTRACT

An improved method of processing nutritious biological material for obtaining fat and a dehydrated and defatted solids residue of palatable nutritious character, using a fat solvent which forms with water from the biological material an azeotrope having a boiling temperature materially lower than that of the solvent itself. Heating of a slurry of solvent and biological material is effected by introducing hot solvent vapor into the slurry below its upper surface so that the incoming vapor is condensed and captured in the slurry which is kept well below the condensation temperature of the solvent vapor by the evaporation from the slurry of azeotrope at the lower boiling temperature of the latter. In condensing and cooling the incoming vapor, the slurry gains heat and boils at the boiling temperature of the azeotrope to distill off azeotrope with attendant defatting and dehydration of the biological material, obviating the input of heat through heat transfer surfaces and the caking of solids on such surfaces.

4 Claims, 6 Drawing Figures

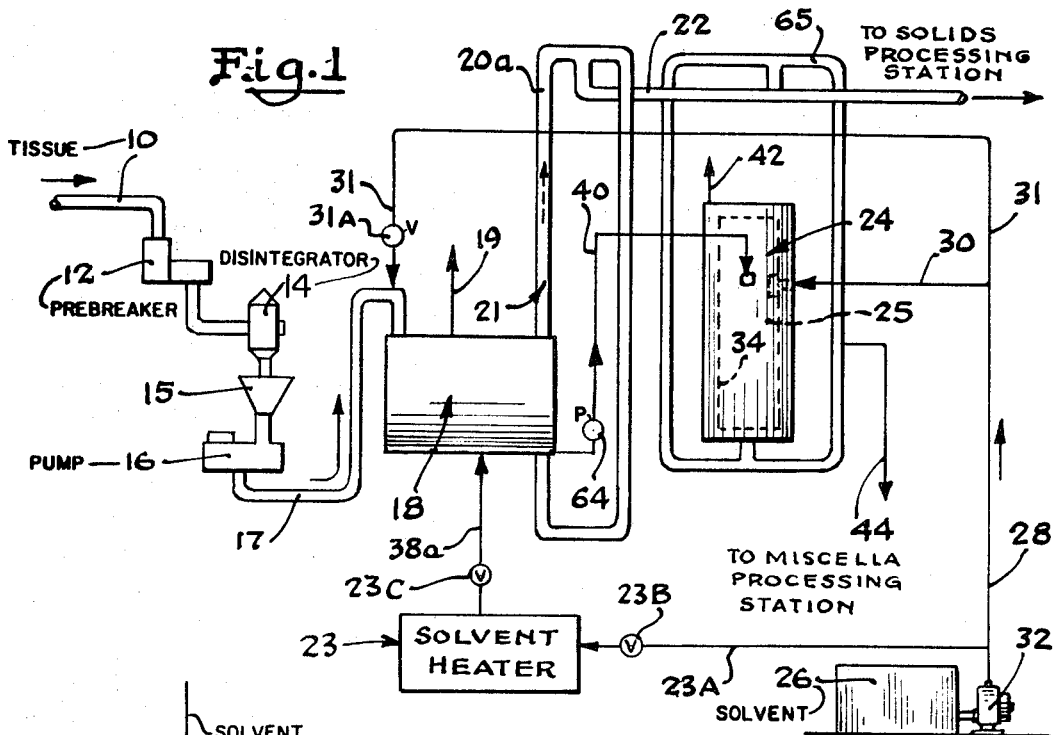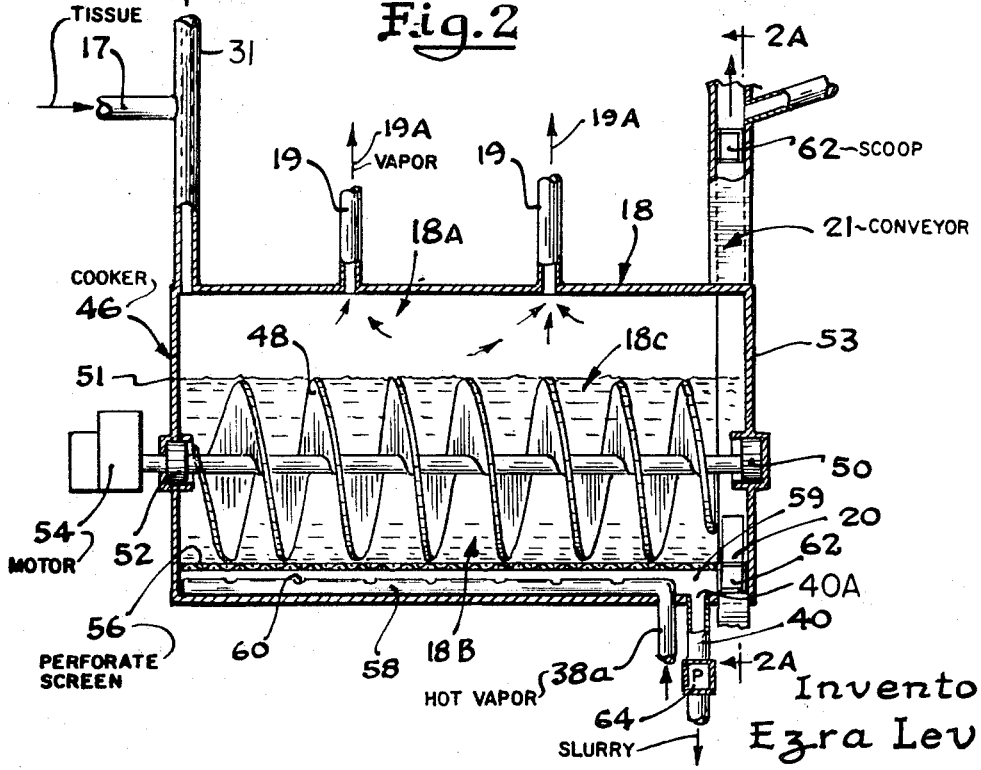

Inventor
Ezra Levin

Attorneys

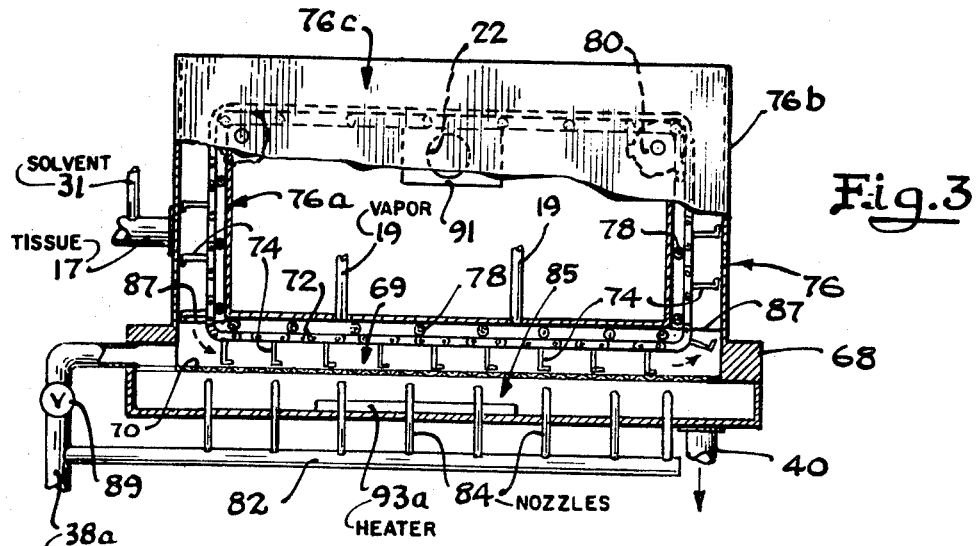
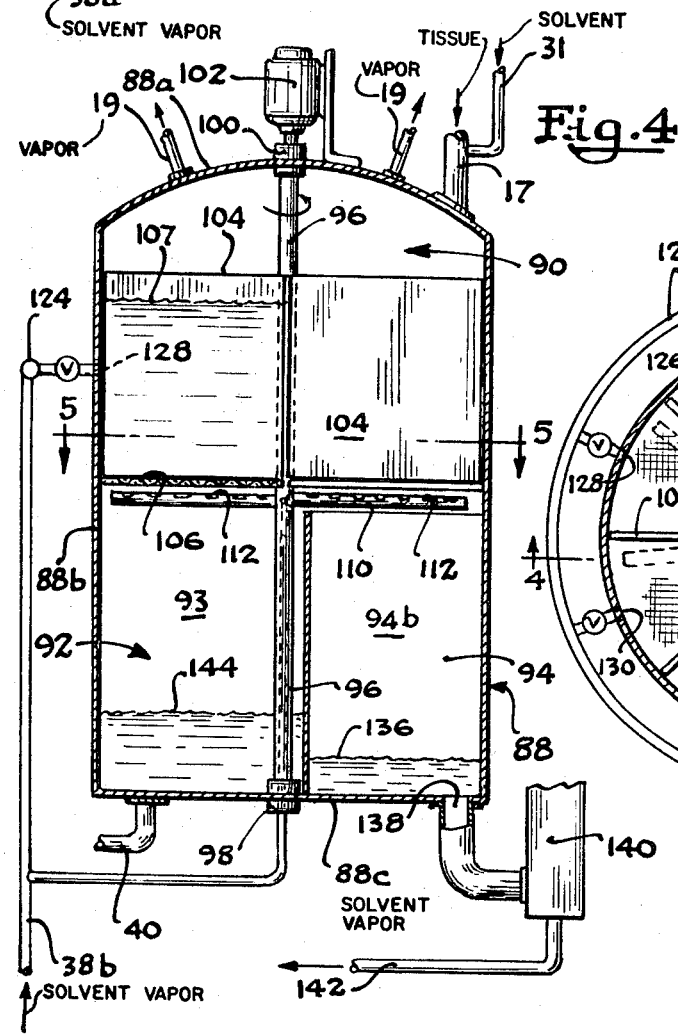
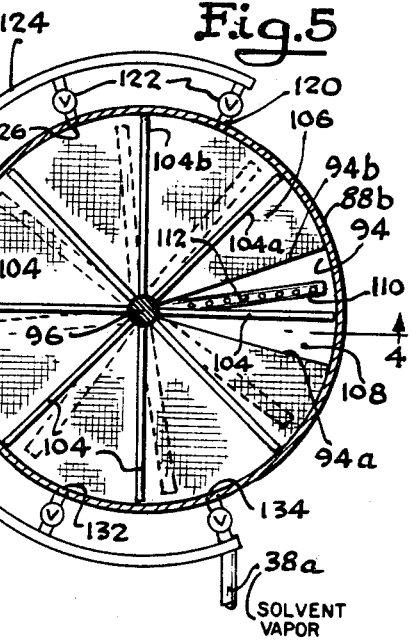
Inventor
Ezra Levin
Attorneys

METHOD OF PRODUCING FAT AND EDIBLE SOLIDS FROM BIOLOGICAL MATERIAL USING VAPOR HEATED SOLVENT

This application is a division of copending application Ser. No. 640,523, filed May 23, 1969, now U.S. Pat. No. 3,509,933 which is a continuation-in-part of application Ser. No. 408,231, filed Nov. 2, 1964 now U.S. Pat. No. 3,538,973.

The present invention relates to an improved method for removing water and fat from edible biological material containing a substantial quantity of water to produce a nutritious and palatable residue of solids and to recover fat from the material.

The overall objective is to produce in a practical and economical manner refined fat and nutritious and palatable solids characteristically high in protein and having an inherently high resistance to spoilage using as a raw material fatty biological tissue containing water and having intrinsic nutritional value. Sizable quantities of such material suitable for such processing are available at low cost and comprise, for example, trash fish, fish and meat scrap, slaughterhouse and packing house offal, and suitable vegetable tissue such, for example, as coconut, that are characteristically subject to quick spoilage and normally regarded as being of little economic value.

In view of the obvious economic advantages to be gained by the successful transformation into nutritious and palatable solids of such materials, which are often allowed to go to waste or substantially so, much technological effort and ingenuity has been directed to the development of workable processes for this purpose. Yet, the commercial operation of prior processes has been attended by persistent shortcomings adding to the cost and difficulty of carrying out the processes.

Processes of the character to which this invention relates involve fragmentizing the raw material and immersing the fragmentized material into a fat solvent capable of dissolving fat from the material and capable of withdrawing water from the material and forming with such water an azeotrope that is distilled off from the bath of solvent into which the material is immersed. Such distillation of azeotrope requires the copious application of heat.

Heretofore, the application of heat to effect distillation of azeotrope from the mixture of solvent and material being processed has been the source of serious operational difficulties involving among other things the propensity of the suspended solids to collect and bake on the heat transfer surfaces through which the requisite heat is applied. The consequent loss of operating efficiency and necessity for periodic cleaning of the apparatus, as well as the cost of providing the requisite heating equipment have created problems from the operational and economic standpoints.

One object of the invention is to provide an improved method for removing water and fat from biological materials of nutritional value using a solvent which dissolves fat and combines with water from the material to form an azeotrope that is distilled off in a manner which effectively avoids contamination and encrustment of the distillation apparatus, the mixture of solvent and fat removed from the biological material by the solvent being subsequently separated from the solids residue of the biological material dehydrated and defatted by the solvent.

Another object is to provide an improved method of the above character for dehydrating and defatting biological material of nutritional value using a fat solvent which forms with water removed from the material by the solvent an azeotrope that is distilled off by heat supplied in the form of a vapor introduced into the mixture of solvent and biological material to effect distillation of the azeotrope while at the same time avoiding addition to the boiling mixture of moisture such as would combine with the solvent to form additional azeotrope and avoiding the escape from the boiling mixture of the incoming heating vapor to the end that the quantity of vapor that must be collected from the boiling mixture and condensed is not contaminated or increased directly by the incoming vapor which is caused to merge with the boiling mixture to evaporate the azeotrope.

Another object is to effect in a method of the character recited the boiling of the biological material in solvent and the concurrent distilling off from the boiling mixture of an azeotrope of solvent and water by means of heat supplied to the boiling mixture in a solvent vapor introduced directly into the boiling mixture and caused to condense completely within the boiling mixture, thus giving up the heat of vaporization to the boiling mixture, and subsequently cooling to a lower temperature at which the mixture is boiling to distill off azeotrope, thus further heating the mixture with the consequence that the azeotrope is distilled off by the heat supplied by the incoming solvent vapor, which vapor itself does not escape condensation and which does not contaminate or directly become a part of the vapor which must be collected from the boiling mixture and condensed.

A further object is to provide a method of the character recited in the preceding objects in which hot solvent vapor used to effect heat distillation of azeotrope from a mixture of solvent and material being processed is caused to continuously clean a screen which effects separation of the processed solids from a miscella of solvent and fat from the biological material for further processing of the separated solids and miscella independently of each other to clean the solids of solvent and to separate the fat and solvent constituents of the miscella.

Further objects will appear from the following description of the invention taken in conjunction with the drawings, in which:

FIG. 1 is a diagrammatic view of an apparatus assembly for separating fat and water from particles of biological tissue, such as fish or meat;

FIG. 2 is a somewhat diagrammatic view of the primary cooker illustrated in FIG. 1;

FIG. 3 is a side elevational view of an alternative embodiment, partly broken away and in section, which can be used in the apparatus assembly shown in FIG. 1, or with other assemblies;

FIG. 4 is a vertical sectional view of an alternative embodiment which can be used in association with the assembly shown in FIG. 1, or with other assemblies; and FIG. 5 is a sectional view along line 5—5 of FIG. 4.

Figure 2A:
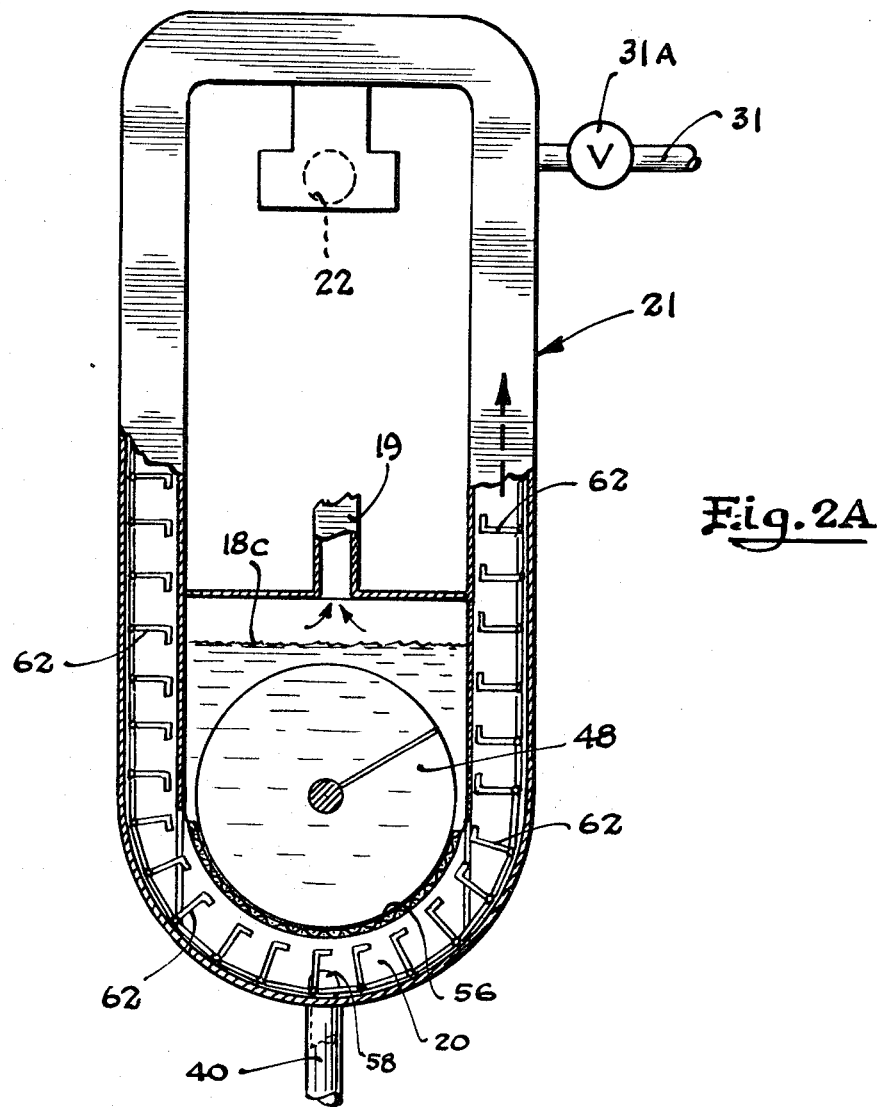
FIG. 2A is a sectional view taken along the line 2A—2A of FIG. 2.

As illustrated in FIGS. 1 and 2, particles of biological tissue, such as fish, meat, coconut or the like, are delivered through a conduit 10 to a prebreaker 12, then to a disintegrator 14, and into a hopper 15. The comminuted tissue in the hopper is of a desirably small particle size which can then be conveyed by a pump 16 to other portions of the apparatus. Such tissue particles are moist because of tissue water, and are introduced by way of tissue inlet 17 into a first vessel or cooker 18 which forms a first processing or azeotroping zone shown generally as 18A. The wet tissue particles are continuously introduced into the azeotroping zone 18A where dehydration and defatting of the tissue in a body 18B of fat solvent commences. The tissue particles may be precoagulated by treatment with a portion of the hot solvent present in the cooker 18 according to the method shown in U.S. Pat. No. 2,503,312, issued to the present inventor and Everette M. Worsham. The tissue particles may also be sprayed into the hot boiling solvent at a point adjacent to the top level of the body or pool of the boiling liquid solvent as shown by the present inventor in his U.S. Pat. No. 2,966,386. In any event, some controlled introduction of the tissue particles into the body or pool 18B of liquid fat solvent within cooker 18 is preferred to avoid agglomeration of the tissue. The solvent in the body 18B in the cooker 18 must be one which forms an azeotrope with water and is water immiscible; and the liquid body 18B only partially fills the cooker, as shown by the level line 18C.

Reference may be made here to the present inventor's issued U.S. Pat. No. 2,619,425, and to his copending application, Ser. No. 408,231, filed Nov. 2, 1964, now U.S. Pat. No.

3,538,973. The foregoing show the use of azeotropic distillation to remove both water and solvent, as a vapor, at a temperature which is lower than the boiling point of the water alone or the solvent alone. Water and many solvents, such as ethylene dichloride or heptane, are said to form a mixture of constant boiling point called an azeotrope.

The foregoing copending application shows how a slurry of particles, solvent and extracted fat is separated to produce defatted and dehydrated particles, fat and solvent. That copending application teaches removing a portion of the slurry from a primary cooker and passing it through a filtering zone where a portion of the particles are removed. Hot vapor solvent is conveyed to the filtering zone from a secondary cooker to keep the filter screen operational. The secondary cooker is employed to treat the portion of the slurry removed from the primary cooker to substantially complete the distillation.

Cookers for solvent extraction, such as the primary and secondary cooker used in the foregoing copending application, have heating means to raise the temperature of the slurry therein to its boiling point. The heat source is conventionally steam which is delivered to heating panels or plates associated with the cooker. This heat source is separate and independent from any heat source which may be required to heat the solvent as must be done to add hot solvent or to employ solvent vapors to maintain a filter operational as described above. A separate heating means for solvent and all the necessary ancillary equipment usually required to operate said separate heating means increases the complexity and the expense of operating the system.

The cooker which was used to simultaneously extract fat from tissue and to form an azeotrope with the water in such tissue generally had heating panels against the walls of the cooker or inside the cooker to impart the necessary heat to the contents thereof. A problem arose from such a use because insoluble and soluble components of the particles caked or conglutinated on such heated panels, particularly when defatting and dehydrating fish or meat, which reduced the heat transfer and the efficiency of transferring miscella and solids from the cooker for further processing. The consequent loss of heat transfer and impediment to discharge of materials from the cooker required periodic shutdown and cleaning of the encrusted plates, panels or other heating surfaces. This likewise added to the complexity and expense of operating the system.

In the cooker 18 of the present application, the mixture of tissue and solvent forms a slurry of wet particles, fat and an azeotrope of water and the solvent, and is heated sufficiently to maintain rapid boiling of the slurry. Vapor from the solvent-water azeotrope is vented through the vent 19 as indicated by the arrow 19A. As will presently appear, the vent 19 constitutes azeotrope vapor receiving means which withdraws azeotrope vapor from the cooker 18 through an outlet in the top of the cooker formed as shown by the vent 19.

The wet solid particles are removed from the azeotroping zone 18 by entering an arcuate tissue outlet 20 which communicates with a run-around conveyor 21. The solid particles with a portion of the tissue water removed, are then deposited in conduit 22 and directed to a solids processing station such as described in applicant's copending patent application Ser. No. 408,231.

Heat is introduced into the cooker 18 to maintain the slurry under rapid boiling conditions, and such heat is obtained according to the present invention from hot vapor of the same solvent as the body 18B formed in a solvent heater 23. The non-aqueous fat solvent is introduced from a reservoir of work tank 26 into the heater 23 by delivery along line 23A, and through a pump 32. A level control valve 23B is used to control the delivery of the solvent into heater vessel 23 from line 23A. The solvent is also delivered to the cooker 18 along a line 28 and a branch line 31 through a level control valve 31A. A secondary cooker 24 also contains a body of slurry 25 and is heated by means such as the interior heating plates indicated at 34. The heater 23 is provided with a pressure control valve 23C at its outlet so that the solvent therein is heated under pressure. As a result, the temperature of vaporization is elevated above that required by the boiling point of the solvent at atmospheric pressure. When heptane is used, its boiling point of 98.4° C. will be accordingly increased. The superheated solvent vapor from the solvent heater 23 is introduced into the primary cooker 18 to maintain the temperature of the slurry in vessel 18 at the boiling point of the azeotrope.

The illustrated apparatus of FIG. 1 shows a line 40 for delivering a portion of the slurry from the primary cooker 18 to the secondary cooker 24. The slurry traveling through this line has a smaller ratio of solids to liquids than exists in the primary cooker because a portion of the solids are removed by the conveyor 21, but the slurry still contains wet particles which are dried in the secondary cooker 24 by azeotropic distillation, the solvent-water azeotrope vapors leaving the secondary cooker 24 as indicated by the arrow 42. The secondary cooker is maintained approximately at the boiling point of the solvent, and a miscella which is substantially free of moisture is conducted out of the secondary cooker to a miscella processing station, as indicated by the arrow 44, where the miscella may be filtered as disclosed in the inventor's copending patent application Ser. No. 408,231.

The primary cooker 18 may take various forms, one of which is indicated in FIG. 2. The cooker 18 comprises a housing or vessel 46 containing a screw conveyor 48, the shaft whereof is journalled at opposite ends at 50 and 52 in the end walls 51 and 53 of the housing. A motor 54 turns the screw conveyor, and the screw is adapted to move the tissue particles which are supported on a perforate screen or support 56 in the form of a part cylindrical segment having a radius approximately equal to the radius of the screw 48. The screen is elongated arcuately shaped in the transverse direction to conform to the contour of the path of the helical screw flights. Thus, the conveyor screw 48 turning in overlying relation to the perforate screen or support 56 functions as mechanical transfer means to move tissue and tissue solids over the perforate support from the inlet 17 to the outlet 20. This type of cooker is particularly preferred when using heptane solvent which is lighter than the tissue particles usually employed. The hot solvent vapor is introduced into the cooker by vapor distributing means comprising the line 38a which leads from the solvent heater 23 to a manifold tube or plenum 58 disposed in a space 59 which extends substantially along the entire length of the screen 56. The plenum has a plurality of holes 60 to emit hot vapor solvent into the interior of the housing 46 to maintain the temperature of the slurry at the boiling point of the azeotrope.

In addition to effecting a heat transfer, the hot vapor solvent also serves to keep screen 56 relatively free of caked tissue. Because of the hot environment, the tissue particles tend to glaze the screen or to otherwise conglomerate and obstruct transfer of the tissue along the length of the screen 56. The tissue particles are continuously moved towards the end 53 of the housing where the conveyor 21 is located. At end 53 of the housing, the tissue particles fall into the run-around conveyor 21 through the arcuate opening 20 and are scooped up in shoes 62.

A portion of the slurry moves out of the housing 46 and into line 40 after being filtered through screen 56. Thus, the line 40 forms miscella receiving means connected to the housing or vessel 46 at a miscella outlet 40A from the vessel disposed below the perforate support or screw 56 as shown in FIG. 2. The screen 56 is maintained open by the jets of vapor from the manifold 58, and only the finer particles pass through the perforations of the screen into the manifold. As a result, the slurry transmitted by the line 40 to the secondary cooker 24 contains fewer particles than the slurry 18B, but the particles are only partially dehydrated. The line 40 contains a pump 64 which transfers a metered quantity of slurry from the primary cooker 18 to the secondary cooker 24 in order to maintain the level of the slurry in the secondary cooker 24.

The portion of the slurry transferred from the primary cooker 18 to the secondary cooker 24 is further defatted and dehydrated in the secondary cooker by azeotropic distillation. Ordinary heating panels 34 are employed in the secondary cooker, and may be employed without the danger of glazing or caking which is present in the primary cooker 18 because the moisture content of the secondary cooker is substantially reduced and the ratio of solids to liquids is much lower in the secondary cooker.

The solid particles in the secondary cooker fall due to the higher specific gravity of these particles than the miscella, and a proportion of the solids of the secondary cooker 24 are removed by a run-around conveyor 65 in communication with the bottom of the secondary cooker 24. The run-around conveyor 65 discharges the solid particles carried thereby into the conduit 22 which conveys these particles with the particles of the primary cooker to the solids processing station.

The miscella from the secondary cooker is removed from the upstream side of the run-around conveyor 65 in order to minimize the solids to liquids ratio in the miscella. The miscella may also be removed directly from the secondary cooker, if desired. The solid particles in the miscella are fully dried and may be removed by a filter, as described in the inventor's patent application Ser. No. 408,231.

Another form of the azeotropic forming zone is indicated in FIG. 3. In this embodiment, a vessel in the form of an elongated housing 68 contains an elongated substantially flat screen 70 at the bottom thereof. A mechanical drag 69 moves the tissue particles along the screen. The mechanical drag 69 is shown as an endless chain 72 having a plurality of interconnected links or shoes 74. The chain is translatable in a run-around housing 76 which has two vertical legs 76a and 76b communicating with opposite ends of the elongated housing 68 and a horizontal leg 76a and 76b. A plurality of fixed rollers 78 are mounted adjacent to the inner side of the legs 76a, 76b and 76c to rotatably engage the chain 72. The chain may be turned by means such as a motor driven sprocket wheel 80. The sprocket wheel 80 is mounted below the upper leg of the run-around conveyor and directly engages the chain 72.

In this embodiment, the hot vapor for forming the azeotrope is conveyed from line 38a to manifold or plenum 82 disposed below the housing 68. The manifold 82 is shown with a plurality of communicating and upright conduits 84 which enter a space 85 located below the screen 70 in the housing 68 and direct hot vapor solvent against screen 70. Particles enter the housing 68 at the intake end from leg 76a and through the tissue inlet 17. The particles may or may not be mixed with relatively cool solvent from the line 31 in order to aid in avoiding conglomeration of the particles. Hot solvent under pressure is also introduced into the housing 68 at the inlet end from the conduit 38a in sufficient quantity to maintain the particles in a flooded condition, namely to maintain a level substantially filling the housing 68, as is indicated at 87 in FIG. 3. A level control valve 89 located in the conduit 38a at the inlet end of the housing 68 accomplishes this function.

A substantial portion of the particles are translated on the upper side of the screen through the housing 68 by the drag 69, and these particles are elevated on the shoes 74 in the leg 76b and translated across the leg 76c to the outlet receptacle 91 which is connected to the conduit 22 which communicates with the solid processing station. The hot vapor solvent from the conduits 84 also removes the conglutinated tissue particles so that the accumulation and glaze does not obstruct movement towards the tissue outlet receptacle 91.

The jets of superheated vapor from the conduits 84 perform four separate functions. First, these jets are the primary source of solvent to maintain the level 87 in the housing, and a volume of slurry must be removed from the housing at least equal to the liquid volume of the vapor from the conduits 84 at all times. Vapor from the line 38a merely makes up any deficiency of solvent in the housing and forms a convenient mechanism for maintaining the level 87.

Second, the jets of vapor from the conduits 84 prevent adherence of masses of sticky wet particles on the upper surface of the screen 68. The vapor from the conduits 84 is dry, and it is believed to rapidly dry any wet particle which might adhere to the screen in the immediate vicinity of the jet in a manner similar to flash drying. As a result, the particle loses its stickiness and is readily dislodged by the shoes of the drag 69. In addition, the vapor pressure forces open the perforations of the screen confronting the jet, thereby aiding dislodgement of particles. The dislodged particles thereupon assume the moisture content of their environment.

Third, the superheated vapor forms a source of heat to maintain the slurry under rapid boiling conditions. Since the vapor releases its heat directly in the slurry, there is essentially no hot surface on which the sticky wet particles can adhere and be baked on. In most cases, sufficient heat can be obtained from vapor alone, or in conjunction with superheated solvent introduced through conduit 38a, but conventional heating panels may also be used if desired, as indicated at 93a.

Fourth, the jets of vapor keep areas of the screen open to permit a slurry of fat, solvent and finer partially dried and defatted particles to flow therethrough to the conduit 40 which carries this slurry to the secondary cooker 24.

The embodiment of FIGS. 4 and 5 may be used to defat and dehydrate particles sufficiently to permit the particles to be directly transmitted to a solids processing station, or may be used as the primary cooker 18 in the assembly illustrated in FIG. 1 depending upon the material being processed and the manner of operation, as will be hereinafter more fully described. In the embodiment of FIGS. 4 and 5, a housing 88 of a generally cylindrical configuration is employed, and the tissue particles are introduced into housing through the inlet conduit 17 which has an opening in the housing cover 88a adjacent to the cylindrical sidewall 88b of the housing 88. The housing 88 has an upper chamber 90 which operates as the azeotrope forming zone and which is adapted to receive comminuted tissue. The housing also has a lower chamber 92 which is divided between a major portion 93 and a minor portion 94 by a pair of walls 94a and 94b. The walls 94a and 94b are sealed to the cylindrical shell 88b of the housing 88 and a flat base 88c, and the walls 94a and 94b converge toward the axis of the cylindrical shell 88b and are sealed together adjacent to the axis of the housing.

The upper portion 90 and lower portion 92 are separated from each other by a screen 106 which extends across the cylindrical shell 88b and is sealed at its periphery thereto. A rotatable shaft 96 is disposed on the axis of the cylindrical shell 88b and journaled in bearings 98 and 100 at the bottom and top of the housing, respectively. A motor 102 is shown for rotating the shaft at a selected rotation rate. A plurality of vanes 104 are mounted on the shaft 96 in the upper chamber 90, and the vanes 104 are disposed at an acute angle to each other. Further, the vanes 104 are disposed in slidable abutment with the screen 106 and with the inner surface of the cylindrical shell 88b. The screen 106 has a plurality of openings distributed throughout the screen which are sufficiently small to permit flooding of the upper portion of the housing 88 to a level designated as 107 for purposes that will be described hereinafter. The screen also has a pie-shaped opening 108 to the upstream side of the inlet 17, and the region of the upper portion 90 of the housing 88 directly above the pie-shaped opening 108 is drained of slurry. It has been found that the screen may have a mesh of approximately 20 and maintain flooding in the upper portion 90 of the housing 88.

The tissue particles, which may include comminuted fish, meat, or other tissue, are introduced into the region of the upper portion 90 of the housing 88 through the inlet 17 and immediately below the inlet 17. The vanes 104 separate this region from other regions, and for illustrative purposes, the region confronting the inlet 17 has been shown bordered by vanes designated 104a and 104b. It is necessary that this region be flooded with boiling solvent on introduction of the comminuted tissue, and in order to accomplish an adequate level of solvent, an opening 120 in the cylindrical shell 88b is provided in this region, and the opening 120 is connected through a flow control valve 122 and a manifold 124 to the solvent conduit 38a which is connected to the source of superheated solvent, namely the solvent heater 23. Further, relatively cool solvent from the branch 31 is mixed with particles prior to introduction into the housing 88 so that an adequate supply of solvent is obtained in the region between the vanes 104a and 104b.

As illustrated, the vanes will rotate in a counterclockwise direction, and the vanes maintain adequate sealing to the screen 106 and the inner surface of the shell 88b to maintain a flooded condition. On introduction of the particles into the zone between the vanes 104a and 104b, an azeotrope is formed with the solvent, and the vapors from the azeotrope are removed from the housing 88 through the vapor outlets 19 located in the dome 88a of the housing.

The rotor shaft 96 is hollow, and is connected through a rotatable coupler to the conduit 38b containing superheated solvent. A plurality of distributors or plenums 100 extend radially from the rotatable shaft 96 immediately adjacent to the lower side of the screen 106, and these distributors 110 contain a plurality of openings or perforations 112 on their upper surfaces confronting the screen 106. Each of the distributors 110 precedes one of the vanes and has the function of emitting superheated vapor through the screen 106 to remove conglomerated particles from the screen and permit the following vane to readily scrape across the screen 106. The superheated vapor from the distributors not only aids in rotation of the vanes against the screen, but also permits a small amount of miscella which contains small tissue particles to pass from the upper compartment 90 to the lower compartment 92 of the housing. In addition, the vapor from the distributors 106 heat the slurry in the upper compartment 90 of the housing 88, and help maintain rapid boiling conditions.

As the vanes 104a and 104b are rotated about the shaft 96, the vane 104a passes the opening 120 to cut off a supply of superheated vapor through the valve 122. Hence, a plurality of additional openings 126, 128, 130, 132 and 134 are disposed in the cylindrical shell 88 communicating with the upper compartments 90 below the level 107 of the slurry, and the compartment formed by the vanes 104a and 104b and the inner surface of the cylindrical shell 88b communicates with these openings. Each of the openings is connected to the manifold or plenum 124 through a flow control valve 122. The flow control valves 122 are adjusted to maintain the level of the slurry in the compartments and to maintain the slurry in the associated compartment under rapid boiling conditions.

As the compartment formed by the vanes 104a and 104b traverses about its path, the moisture content of the slurry declines. If the moisture content in the slurry declines sufficiently to permit the slurry to assume the boiling point of the solvent, rather than the azeotrope, rapid boiling conditions in the compartment will cease due to the fact that the higher temperature of the boiling point of the azeotrope must be maintained and the heat source formed by vapors of that solvent is inadequate for that purpose. When the compartment comes into alignment with pie-shaped opening 108, the contents of the compartment are dumped into the minor portion 94 of the lower compartment 92.

As indicated in FIG. 4, a level of slurry 136 which consists primarily of fat, solvent, and solid particles, appears in this minor portion of the lower compartment and is drawn from the compartment through the opening 138 to a run-around conveyor 140 which elevates the solid particles and permits their removal to a solid particles processing station. The run-around conveyor also is connected to a conduit 142 which may be directly processed, that is, the solid particles removed therefrom by filtering and the fat and solvent separated.

In the azeotroping process is not carried on sufficiently to reduce the moisture content of the slurry to permit the slurry to boil at the boiling point of the solvent, then it is necessary to further process the liquid portion removed from the run-around conveyor 140 through the conduit 142. Further processing can be achieved by connecting the conduit 142 with the conduit 40 and introducing this slurry into the secondary cooker 24.

A portion of the slurry of all compartments in the upper compartment of the housing 88 passes through the screen and is collected in the major part of the lower compartment 92. This slurry contains moisture as well as fat, solvent and solid particles, and is preferably processed by introducing it into the secondary cooker 24 through the conduit 40. It is to be noted that there is a relatively low level of slurry in this major part of the lower compartment also, the level being indicated at 144.

An example of practicing the method and using the apparatus of the invention will now be described, but such example is intended to only illustrate a selective embodiment of the invention and should in no way be considered as an exclusive teaching.

Whole fish containing about 50 to 60 percent of moisture are cut up into large chunks, the chunks are pretreated with steam for 5 seconds and thereafter ground in the prebreaker 12 to particle sizes of less than about 0.5 inch in diameter. The particles are further comminuted in the disintegrator, and then transferred to the cooker 18. The cooker is about one-half full of heptane solvent. The heptane is replenished as desired from inlet line 31. The temperature within the cooker is maintained at azeotropic forming levels, or at least 79.5° C., by delivering hot heptane vapors having a temperature of at least 98.4° C. The divergent temperature between the hot heptane vapor and the azeotropic vapor is at least about 22° C. which is an advantageous difference for efficient heat transfer. One of the advantages of using heptane is that the divergent temperature is greater than that obtained with many other non-aqueous fat solvents, for example, the highly useful ethylene dichloride has a divergent temperature of 11.5° C. between its boiling point and the azeotropic forming level.

One of the difficulties in processing wet sticky tissue is that the tissue adheres to surfaces, particularly heating panels, and renders the equipment inoperative or inefficient and requires cleaning of the equipment. In accordance with the present invention, a principal heat source is solvent vapor which directly transfers heat to the slurry of that solvent and wet particles. When the wet particles are adequately dried, they will not adhere to surfaces, and can be processed in a normal manner.

Solvent vapors may be introduced into a slurry of that solvent and wet particles either through openings in the vessel containing the slurry or through a perforated surface. If the particles are heavier than the solvent employed, they will fall to the bottom of the vessel and tend to coagulate on the bottom surface. To avoid coagulation, means such as a screw conveyor, a drag, or rotating vanes must be provided. Such means must come in contact with the bottom of the vessel, and hence the wet particles adhering to the bottom tend to impede motion of the means utilized to move the particles along a path. In accordance with the present invention, retardation of motion caused by adhering particles is substantially reduced by utilizing a perforated screen directly beneath the mechanical means for moving the particles and impressing jets or streams of vapor through the screen, thereby releasing both by mechanical action and drying the adhered particles.

The invention may be practiced in the many ways which will occur to such practitioners, and such invention should be limited only by the terms of the following claims as given further meaning by the preceding description.

The invention is claimed as follows:

1. The method of removing fat and water from nutritious biological material for obtaining fat and for producing a dehydrated and defatted solids residue of palatable nutritious character, which comprises providing in an azeotrope-forming zone within a distillation vessel a pool in liquid form of fat solvent which forms with water from the biological material an azeotrope having a boiling temperature materially lower than the boiling temperature of the solvent itself, fragmentizing the biological material and introducing the fragmentized material into the pool of liquid solvent to form therewith in the azeotrope-forming zone a pool of fluent slurry of solvent, fragmentized biological material, water, and fat, in a generally liquid state, heating solvent to form hot solvent vapor, introducing such hot solvent vapor into the pool of slurry within said azeotrope-forming zone below the upper surface of such pool of slurry to condense and capture the incoming solvent vapor by the liquid slurry which is kept at a temperature well below the condensing temperature of the solvent by evaporation from the pool of slurry of azeotrope at the lower boiling temperature of the latter and to boil off azeotrope from the pool of slurry by the heat gained by the slurry in cooling and condensing the incoming solvent vapor, withdrawing from the azeotrope forming zone azeotropic vapor issuing from the pool of slurry boiled by the introduction thereinto and condensation and cooling therein of hot solvent vapor, and removing from the azeotrope-forming zone of the distillation vessel defatted and dehydrated solids of the biological material and a liquid miscella of solvent and fat removed by the solvent from the biological material.

2. The method of removing fat and water from nutritious biological material for obtaining fat and for producing a dehydrated and defatted solids residue of palatable nutritious character, which comprises providing in an azetrope-forming zone within a distillation vessel a pool in liquid form of fat solvent which forms with water from the biological material an azeotrope having a boiling temperature materially lower than the boiling temperature of the solvent itself, fragmentizing the biological material and introducing the fragmentized material into the pool of liquid solvent to form therein in the azeotrope-forming zone a pool of fluid slurry of solvent, fragmentized biological material, water, and fat in generally liquid state, heating solvent to form hot solvent vapor, introducing such hot solvent vapor into the pool of slurry within said azeotrope-forming zone below the upper surface of such pool of slurry to condense and capture the incoming solvent vapor by the liquid slurry which is kept at a temperature well below the condensing temperature of the solvent by evaporation from the pool of slurry of azeotrope at the lower boiling temperature of the latter and to boil off azeotrope from the pool of slurry by the heat gained by the slurry in cooling and condensing the incoming solvent vapor, withdrawing from the azeotrope forming zone azeotropic vapor issuing from the pool of slurry boiled by introduction thereinto and condensation and cooling therein of hot solvent vapor, removing from the azeotrope-forming zone of the distillation vessel defatted and dehydrated solids of the biological material, and removing from the azeotrope-forming zone of the distillation vessel a liquid miscella of solvent and fat removed by the solvent from the biological material, transferring said liquid miscella from the azeotrope-forming zone mentioned to a second azeotrope-forming zone isolated from the first mentioned azeotrope-forming zone, the liquid miscella and entrained solids being further heated in the second azeotrope-forming zone to a temperature higher than the boiling temperature of the azeotrope to effect further removal of water from the biological material solids by distilling off of azeotrope formed by the solvent and the residual water of the biological material solids in the second azeotrope-forming zone, and withdrawing from the second azeotrope forming zone the azeotrope vapor.

3. The method of removing fat and water from nutritious biological material for obtaining fat and for producing a dehydrated and defatted solids residue of palatable nutritious character, which comprises providing in an azeotrope-forming zone within a distillation vessel a pool in liquid form of fat solvent which forms with water from the biological material an azeotrope having a boiling temperature materially lower than the boiling temperature of the solvent itself, said solvent having a specific gravity less than that of the biological material, said pool of solvent being divided by a perforated screen into an upper and a lower region, fragmentizing the biological material and introducing the fragmentized material at an inlet position into the upper region of the pool of liquid solvent to form therewith in the azeotrope-forming zone a pool of fluent slurry in a generally liquid state, heating solvent to form hot solvent vapor, introducing such hot solvent vapor into the lower region of the pool of slurry within said azeotrope-forming zone to capture and condense the incoming solvent vapor by the liquid slurry which is kept at a temperature well below the condensing temperature of the solvent by evaporation from the pool of slurry of azeotrope at the lower boiling temperature of the latter and to boil off azeotrope from the pool of slurry by the heat gained by the slurry in cooling and condensing the incoming solvent vapor, translating the slurry in the upper region of the pool thereof from the inlet position to an outlet position in successive portions divided from each other, withdrawing from the azeotrope-forming zone azeotropic vapor issuing from the pool of slurry boiled by the introduction thereinto and cooling and condensation therein of hot solvent vapor, removing from the discharge position in the azeotrope-forming zone of the distillation vessel defatted and dehydrated solids of the biological material, and removing from the azeotrope-forming zone a liquid miscella of solvent and fat removed by the solvent from the biological material.

4. The method of claim 3 in which the successive portions of the biological material are moved along the perforate screen in an arcuate path to the outlet position, said introduction of said hot solvent vapor being directed against the perforate screen from a vapor outlet which moves along the underside of the screen to progressively clean successive areas of said screen.

* * * * *